(12) United States Patent
Hasberg et al.

(10) Patent No.: US 11,402,492 B2
(45) Date of Patent: Aug. 2, 2022

(54) SURROUNDINGS DETECTION SYSTEM FOR MOTOR VEHICLES

(71) Applicant: Robert Bosch GmbH, Stuttgart (DE)

(72) Inventors: Carsten Hasberg, Ilsfeld-Auenstein (DE); Jan-Hendrik Pauls, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 16/591,866

(22) Filed: Oct. 3, 2019

(65) Prior Publication Data

US 2020/0110169 A1 Apr. 9, 2020

(30) Foreign Application Priority Data

Oct. 4, 2018 (DE) .......................... 102018216984.5

(51) Int. Cl.
| | |
|---|---|
| *G01S 13/86* | (2006.01) |
| *G01S 17/89* | (2020.01) |
| *G01S 7/41* | (2006.01) |
| *G01S 13/89* | (2006.01) |
| *G01S 13/931* | (2020.01) |
| *G01S 17/04* | (2020.01) |

(52) U.S. Cl.
CPC .............. *G01S 13/865* (2013.01); *G01S 7/41* (2013.01); *G01S 13/867* (2013.01); *G01S 13/89* (2013.01); *G01S 13/931* (2013.01); *G01S 17/04* (2020.01); *G01S 17/89* (2013.01)

(58) Field of Classification Search
CPC ...... G01S 13/865; G01S 13/867; G01S 13/89; G01S 13/931; G01S 17/04; G01S 17/89; G01S 7/41
See application file for complete search history.

(56) References Cited

U.S. PATENT DOCUMENTS

| | | | | |
|---|---|---|---|---|
| 2012/0293357 A1* | 11/2012 | Nishigaki | ............ | G01S 17/931 342/52 |
| 2017/0347036 A1* | 11/2017 | Krokel | ...................... | B60R 1/00 |
| 2019/0235071 A1* | 8/2019 | Reiher | ................. | G05D 1/0257 |

* cited by examiner

*Primary Examiner* — Bryan Bui
(74) *Attorney, Agent, or Firm* — Norton Rose Fulbright US LLP; Gerard Messina

(57) ABSTRACT

A surroundings detection system for motor vehicles, including multiple sensors which are sensitive to electromagnetic radiation in different ranges of the electromagnetic spectrum, and including associated evaluation modules for locating and/or classifying objects present in the surroundings based on the data supplied by the sensors, including a model module in which a surroundings model is stored which, in addition to the 3D position data of the objects, also contains data about the spectral reflection properties of surfaces of the objects, the model module being capable of providing these data to the evaluation modules.

5 Claims, 3 Drawing Sheets

SURROUNDINGS DETECTION SYSTEM FOR MOTOR VEHICLES

CROSS REFERENCE

The present application claims the benefit under 35 U.S.C. § 119 of German Patent Application No. DE 102018216984.5 filed on Oct. 4, 2018, which is expressly incorporated herein by reference in its entirety.

FIELD

The present invention relates to a surroundings detection system for motor vehicles, including multiple sensors, which are sensitive to electromagnetic radiation in different ranges of the electromagnetic spectrum, and including associated evaluation modules for locating and/or classifying objects present in the surroundings based on the data supplied by the sensors.

BACKGROUND INFORMATION

In driver assistance systems for motor vehicles, it is important to detect preferably precisely the surroundings of the vehicle with the aid of a suitable sensor system. In the wake of increasing automation of vehicle guidance, increasingly stricter demands are placed on the precision and reliability of surroundings detection systems.

Conventionally, different types of sensors are used which operate in different ranges of the electromagnetic spectrum, for example, long-range and short-range radar sensors at different radar sequences, LIDAR sensors and optical cameras. When the data obtained from the various sensors are consolidated with one another, the image of the detected surroundings may be completed.

One problem, however, is that the radiation emitted or reflected by the objects may be reflected on surfaces of other objects and then pass to the sensor in several ways, as a result of which pseudo objects are simulated in the sensor that in actuality do not exist. Examples are the reflection of radar radiation on roadway surfaces or on guardrails, the reflection of visible light on store windows and the like. The pseudo objects simulated in this manner are often difficult to distinguish from real objects, so that an inaccurate picture of the surroundings is obtained.

SUMMARY

An object of the present invention is to provide a surroundings sensor system, which enables a better distinction between real objects and reflection-related artifacts.

This object may be achieved according to example embodiments of the present invention by a model module, in which a surroundings model is stored, which in addition to 3D position data of the objects, also contains data about the spectral reflection properties of surfaces of the objects, the model module being capable of providing these data to the evaluation modules.

Based on the model stored in the model module, it is then possible to simulate the beam propagation in the wavelength ranges in which the relevant sensors are sensitive and thus to predict the occurrence of pseudo objects generated by multiple reflection. Based on this piece of information it is then possible to more easily filter out the pseudo objects when evaluating the sensor data, so that the likelihood of false interpretations is significantly reduced.

Advantageous example embodiments and refinements of the present invention are described herein.

Data may be stored in the surroundings model, which characterize the positions and, with more or less high spatial resolution, the geometries of the objects present in the surroundings. Based on these data, it is then possible to also determine the locations, geometries and orientations of object surfaces on which potential reflections may occur. In addition, for each of these surfaces, at least one parameter is stored, which characterizes the reflection properties of the surface at one or at multiple of the wavelengths used in the sensors. For example, a reflection coefficient and/or a gloss parameter may be stored for each surface and for each frequency of interest, the gloss parameter indicating the relationship between directed reflection and diffuse scattering of the radiation.

In one specific embodiment, the model module may be implemented in the vehicle. The data for constructing the model are then supplied by the sensors used for surroundings detection and, if necessary, supplemented by "prior knowledge" about the typical nature of objects. If, for example, a noise barrier, a guardrail or a building front is identified using a camera system, then the position and orientation of the reflected surfaces may be identified based on the camera data and entered in the model. At the same time, the reflection properties for visible light and for radar radiation in the frequencies of interest may be estimated and also entered into the model, so that predictions may be made about reflection-related artifacts.

Conversely, the data supplied by a radar sensor or LIDAR sensor may be used for an exact determination of the distance of the objects in order to obtain distance information, which would be potentially difficult to obtain with the required precision using a camera system, even using a stereo camera. Through access to the surroundings model, it is then possible to provide distance data that facilitate the interpretation of the camera image to the evaluation module of the camera system.

The surroundings model may be dynamically adapted at the respective location of the vehicle equipped with the surroundings detection system, as well as at the locations of movable objects (such as, for example, other vehicles).

In another specific embodiment, however, the model module may also be implemented fixedly outside the vehicle in a server, which communicates wirelessly with the surroundings detection system in the vehicle. Such a fixed model module is suitable, in particular, for storing a surroundings model for a given route section in the traffic network and is able to provide its data to the surroundings detection system of multiple vehicles. The advantage is that in this case, the reflection properties of the surfaces as well as the locations and geometries of the objects may be measured or drawn from other sources and input manually into the model, as a result of which a greater accuracy of the model is achieved. Since it is possible to perform updates of these data at best from time to time, the model in this case is more of a static model.

It is particularly advantageous to combine the two specific embodiments with one another, so that the evaluation modules have on the one hand access to a dynamic model in the local model module and, on the other hand, access to a static but more accurate model in the fixed module.

Exemplary embodiments of the present invention are explained in greater detail below with reference to the figures.

DETAILED DESCRIPTION OF EXAMPLE EMBODIMENTS

Figure 1:
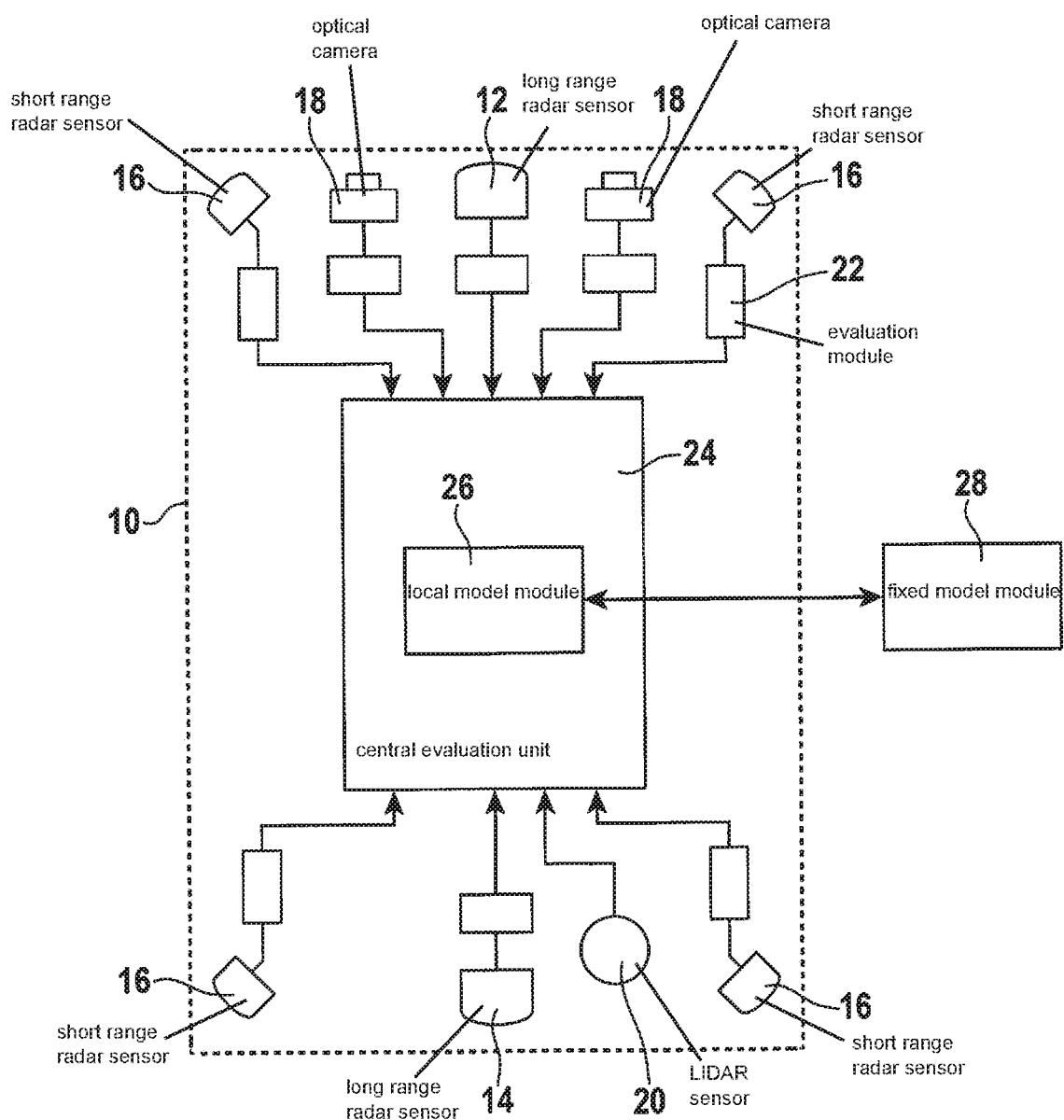
FIG. 1 shows a block diagram of a surroundings detection system according to the present invention.

FIG. 1 schematically depicts an outline of a motor vehicle 10, in which various sensors for surroundings detection are installed. The sensors in the example shown are long-range radar sensors 12, 14, which operate at a frequency of, for example, 76 GHz and are used, in particular, for detecting the traffic ahead and the traffic following behind, short-range radar sensors 16, which operate at a frequency of, for example, 24 GHz and are installed on the four corners of the vehicle in order to monitor the nearer surroundings of the vehicle, a stereo camera system including two optical cameras 18 installed on the front end of the vehicle and a LIDAR sensor 20 for all-round monitoring of the surroundings using a LIDAR beam, which has a particular frequency in the visible range of the spectrum or in the infrared range. Each of these sensors is assigned an evaluation module 22 for the preliminary evaluation of the data supplied by the sensor. The results of this preliminary evaluation are then conveyed to a central evaluation unit 24 where they are further processed and consolidated with one another in order to obtain a preferably complete picture of the vehicle surroundings, which then forms the basis for various vehicle assistance functions or for autonomous vehicle control functions.

In central evaluation unit 24, a local model module 26 is implemented, in which a surroundings model is stored, which specifies the positions and geometries of the objects in the present surroundings of vehicle 10 located by the on-board sensors. The model is continuously updated based on the data supplied by evaluation modules 22.

In the example shown, central evaluation unit 24 communicates wirelessly with a fixed model module 28, which is implemented, for example, in a server outside the vehicle, and in which a static model of the traffic infrastructure and of static objects in the route section passed through by vehicle 10 is stored.

Figure 2:
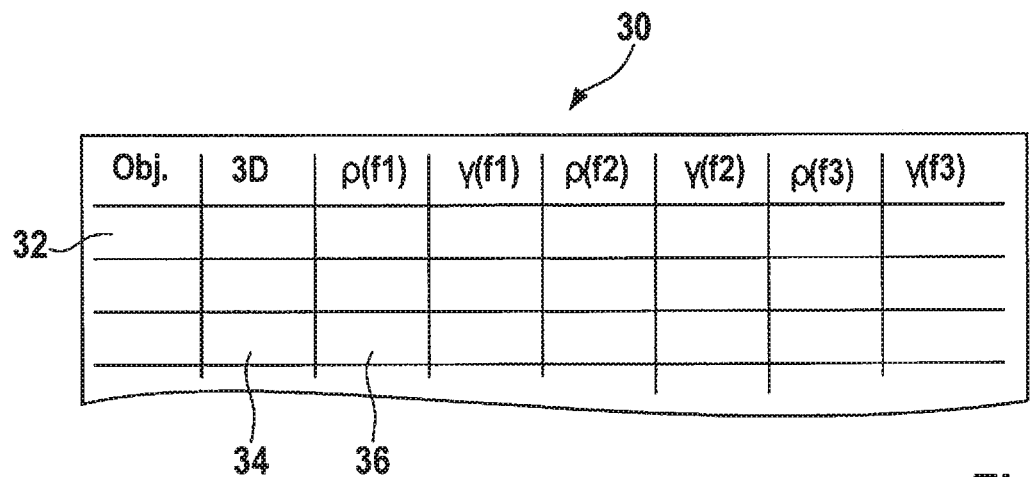
FIG. 2 shows an example of a data structure of a surroundings model.

FIG. 2 shows an example of a data structure of a surroundings model 30 stored in model module 26 or 28. The model contains a list of objects 32 present in the surroundings.

Examples of such objects in the case of local model module 26 would be, for example: "directly preceding vehicle", "vehicle in the adjacent lane", "pedestrian on the side of the roadway", "guardrail", "roadway surface" and the like. Each of these objects has been located by at least one of sensors 12 through 20 and, if necessary, classified by comparing the data of multiple sensors.

In the case of the fixed model module 28, objects 32 could, for example, be buildings to the left and right near the roadway or also guardrails, the roadway surface and the like.

3D position data 34 for each of objects 32 are stored in the surroundings model, which characterize the position and, if necessary, geometry of the relevant object. In local model module 26, the position data in the case of a preceding vehicle could, for example, be the distance measured by the radar sensor and the direction angle (in azimuth and, if necessary, also in elevation). In the case of a guardrail, position data 24 could, for example, be constituted by the position and orientation of the main surface of the guardrails, and in the case of the roadway surface, the position data could include the inclination of the roadway as a function of the distance. In local model module 26, these position data could, for example, be calculated based on the camera data, whereas in fixed model module 28, these data may be input directly. In the case of an approximately block-shaped building stored in fixed model module 28, position data 34 could be the coordinates of the corners of the building in a fixed global coordinate system.

For each object 32, it is possible, based on 3D position data 34, to identify surfaces, on which electromagnetic radiation may be more or less readily reflected depending on the wavelength. Of interest in this case are, in particular, surfaces that are capable of reflecting the radiation in one of the sensors of vehicle 10. For each of these surfaces, a set of data 36 is stored in surroundings model 30, which specify the spectral reflection properties of the relevant surface, for example, on the basis of known material properties or, if necessary, on the basis of previous measurements or object classifications. In the example shown, one reflection coefficient ρ and one gloss parameter y are stored for three different frequencies f1 (76 GHz), f2 (24 GHz) and f3 (frequency of the visible light used by LIDAR sensor 20). Based on these data, it is then possible to calculate for each observed surface how electromagnetic radiation of the relevant wavelength is reflected and/or scattered on the surface. Based on the calculation results, it may then be decided whether the reflected or scattered radiation passes into one of the on-board sensors where it simulates a pseudo object. The strength of the signals indicating the pseudo object may also be predicted within certain limits. This makes it easier to differentiate in evaluation modules 22 or in central evaluation unit 24 between real objects and pseudo objects based on reflections.

Figure 3:
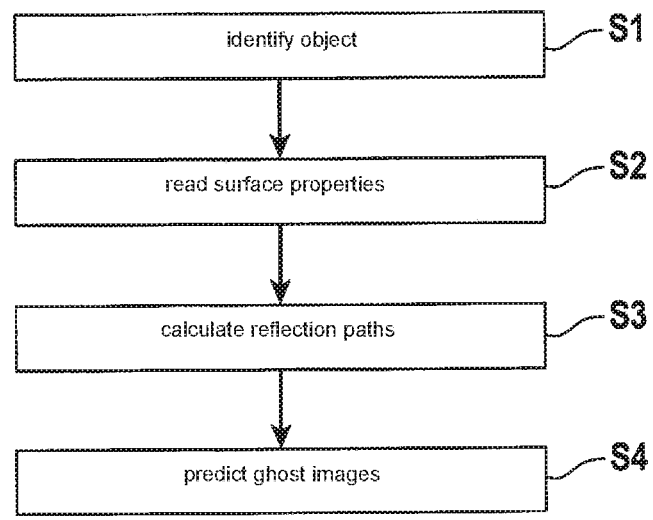
FIG. 3 shows a flow chart for a routine for predicting reflection artifacts running in the surroundings detection system according to FIG. 1.

FIG. 3 shows the main steps of a method, with which, for example, the occurrence of pseudo objects or ghost images is predicted in central evaluation unit 24. In step S1, a single object is identified based on the signals supplied by one or by multiple evaluation modules. This object is then sought out in surroundings model 30 in step S1, and 3D position data 34 as well as data 36 relating to the reflection properties of the object are read in step S2, the position data, if necessary, being converted into a vehicle-fixed coordinate system. In step S3, reflection paths are then calculated for beams that emanate from a localized object and that are reflected on the surface, the properties of which have been read in step S2. In step S4, the reflection paths are then selected which lead to one of on-board sensors 12 through 20 and, based on the reflection properties applicable for the respective frequency, the signal is predicted, which generates a ghost image in the relevant sensor.

Figure 4:
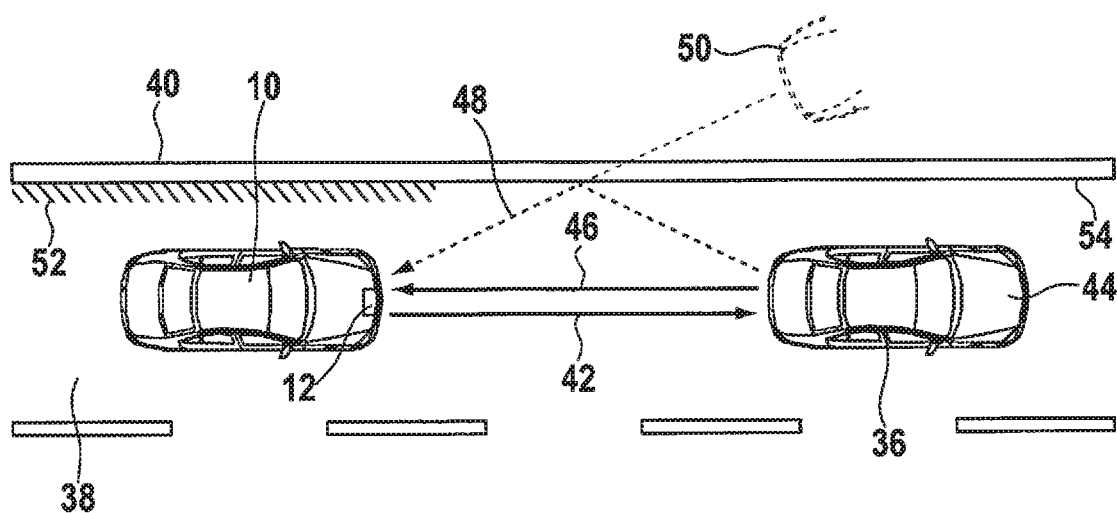
FIGS. 4 and 5 show sketches of traffic situations for illustrating applications of the present invention.

FIG. 4 illustrates as an example a situation, in which vehicle 10 is driving on a roadway 38, on one side of which a noise barrier 40 is installed. Radar sensor 12 of vehicle 10 emits a radar beam 42, which is reflected on the back of a preceding vehicle (object) 44 and passes directly back to radar sensor 12 as reflected beam 46. Since, however, the back of vehicle 44 is not completely flat, a portion of the radar radiation is also reflected in the direction of noise barrier 40 and is reflected again on the noise barrier, so that a reflected beam 48 passes by detour to radar sensor 12 where it simulates a pseudo object 50, which has the same relative speed as vehicle 44, but a somewhat greater distance and is seen at a different direction angle.

This process may be simulated based on the procedure illustrated in FIG. 3, so that pseudo object 50 may be predicted and be correctly interpreted as a false object.

Noise barrier 40 in the example shown has a roughened, sound-absorbing structure 52 in one section (to the left in FIG. 4), whereas a subsequent section of the noise barrier has a smooth surface 54. The radar radiation is at best diffusely scattered on the roughened structure 52, so that at best a weak reflection signal is generated, which is barely distinguishable from the noise background. However, when the vehicles reach the section of noise barrier 40 with smooth surface 54, a clear reflection signal suddenly occurs, which then must be quickly and correctly interpreted by the surroundings detection system of vehicle 10. The structural change to noise barrier 40 may be recognized using cameras 18 on vehicle 10, so that the sudden occurrence of the reflection signal may then be predicted. A prediction on the basis of the model stored in fixed model module 28 is also possible.

It is analogously also possible to predict reflections of visible light, for example, on a storefront window.

Another example is the prediction of reflections of radar beams on the roadway surface. These reflections may be calculated based on the stored roadway inclination and/or based on the roadway inclination estimated with the aid of cameras 18. It is also possible, for example, to distinguish between a wet roadway surface and a dry roadway based on the camera image and to then adapt the reflection properties for the radar radiation in surroundings model 30 accordingly.

Figure 5:
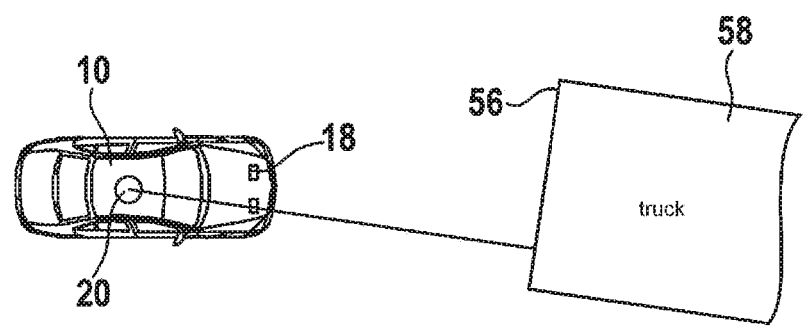

FIG. 5 illustrates an example, in which a back 56 of a preceding truck 58 is located using cameras 18 and LIDAR sensor 20 of vehicle 10. Back 56 is formed, for example, by a folded-up loading platform, which has a flat, almost featureless surface. This complicates a distance measurement using the stereo camera system, since the parallax shift of an identified structure in the field of view of the camera would have to be determined.

Since the vehicles are just negotiating a curve, back 56 with the forward direction of vehicle 10 forms no right angle. Since back 56 has a high gloss value in the visible light, LIDAR sensor 20 delivers a signal only when its beam strikes back 56 at a right angle. Thus, with the aid of LIDAR sensor 20, it is not apparent that the back is in actuality a significantly wider object. Based on the data of cameras 18, it is now possible to supplement the information in surroundings model 30 that back 56 is largely flat and featureless and has a high gloss value.

Conversely, a more precise value for the distance between back 56 and vehicle 10 may be specified based on the data of the LIDAR sensor. By consolidating these pieces of information, it may be unambiguously established that the object seen by cameras 18 is the same back 56 that has been located by LIDAR sensor 20. On the one hand, it is to be expected due to the high gloss value of the back that it is located by the LIDAR sensor only as a punctiform object, even though in actuality it is significantly wider. Conversely, the piece of distance information supplied by the LIDAR sensor makes it possible to look specifically for structures in the camera images that are difficult to identify, the parallax of which has exactly the value consistent with the measured distance, as a result of which the distance measurement may also be verified with the aid of the camera system.

In a situation in which truck 58 is stopped and the loading platform is just being folded down, the increasing inclination of back 56 results in a sudden disappearance of the signal of LIDAR sensor 20. That gives cause to look for a change in the outline shape of the loading platform in the camera images and thus to establish that the loading platform is just being folded down and the danger of collision potentially increases as a result.

What is claimed is:

1. A surroundings detection system for a motor vehicle, comprising:
   multiple sensors which are sensitive to electromagnetic radiation in different ranges of the electromagnetic spectrum;
   evaluation modules associated to the multiple sensors and configured to locate and/or classify objects present in surroundings of the motor vehicle based on data supplied by the sensors;
   a central evaluation unit coupled to the evaluation modules and configured to update a surroundings model based on data generated by the evaluation modules; and
   at least one model module in which is stored the surroundings model, wherein the surroundings model, in addition to 3D position data for each of the objects, also contains data about spectral reflection properties of surfaces for each of the objects, wherein the at least one model module is configured to provide the 3D position data and the spectral reflection properties data to the evaluation modules.

2. The surroundings detection system as recited in claim 1, wherein the at least one model module is implemented locally in the motor vehicle.

3. The surroundings detection system as recited in claim 1, wherein the at least one model module is implemented in a fixed server, which communicates wirelessly with the central evaluation unit in the vehicle.

4. The surroundings detection system as recited in claim 1, wherein the at least one model module includes a local model module implemented in the vehicle and a fixed model module implemented outside the vehicle.

5. The surroundings detection system as recited in claim 1, wherein the central evaluation unit is configured to calculate, based on the 3D position data and the spectral reflection properties data stored in the surroundings model, reflection paths for electromagnetic radiation, which emanates from a located object and passes into one of the sensors of the surroundings detection system via reflection on a surface of another object, and wherein the evaluation unit is further configured to predict signals based on the calculated reflection paths, which are interpretable in the evaluation modules as signals from objects, and to identify objects corresponding to the signals as pseudo objects.

* * * * *